United States Patent
Shih et al.

(10) Patent No.: US 11,747,987 B2
(45) Date of Patent: Sep. 5, 2023

(54) METHODS FOR CONTROLLING DATA TRANSFER SPEED OF A DATA STORAGE DEVICE AND AN ELECTRONIC DEVICE UTILIZING THE SAME

(71) Applicant: Silicon Motion, Inc., Jhubei (TW)

(72) Inventors: Fu-Jen Shih, New Taipei (TW); Chia-Ching Huang, Zhubei (TW)

(73) Assignee: Silicon Motion, Inc., Hsinchu County (TW)

( * ) Notice: Subject to any disclaimer, the term of this patent is extended or adjusted under 35 U.S.C. 154(b) by 79 days.

(21) Appl. No.: 15/868,574

(22) Filed: Jan. 11, 2018

(65) Prior Publication Data

US 2018/0275892 A1 Sep. 27, 2018

(30) Foreign Application Priority Data

Mar. 22, 2017 (TW) .................................. 106109514

(51) Int. Cl.
*G06F 3/06* (2006.01)
*G06F 13/40* (2006.01)
*G06F 13/42* (2006.01)

(52) U.S. Cl.
CPC .......... *G06F 3/0613* (2013.01); *G06F 3/0625* (2013.01); *G06F 3/0659* (2013.01); *G06F 3/0673* (2013.01); *G06F 3/0679* (2013.01); *G06F 13/4068* (2013.01); *G06F 13/4295* (2013.01); *Y02D 10/00* (2018.01)

(58) Field of Classification Search
CPC .... G06F 3/0613; G06F 3/0625; G06F 3/0659; G06F 3/0673; G06F 3/0679; G06F 13/4068; G06F 13/4295
See application file for complete search history.

(56) References Cited

U.S. PATENT DOCUMENTS

| | | | | |
|---|---|---|---|---|
| 2002/0188885 | A1* | 12/2002 | Sihlbom et al. | .......... G06F 1/04 713/600 |
| 2008/0007192 | A1* | 1/2008 | Williams | ............. H03G 3/3042 318/471 |
| 2008/0209420 | A1* | 8/2008 | Matsuo | ................. G06F 3/0613 718/100 |
| 2015/0032915 | A1 | 1/2015 | Hur | |
| 2015/0149858 | A1* | 5/2015 | Cha | ........................ G06F 11/10 714/763 |
| 2017/0255389 | A1* | 9/2017 | Tan | ........................ G06F 3/0659 |
| 2018/0260320 | A1* | 9/2018 | Li | ....................... G06F 12/0246 |

FOREIGN PATENT DOCUMENTS

| | | |
|---|---|---|
| CN | 101571839 A | 11/2009 |
| CN | 105917287 A | 8/2016 |
| TW | 200532446 | 10/2005 |
| TW | I268425 B | 12/2006 |
| TW | 201334469 A | 8/2013 |
| TW | 201418954 A | 5/2014 |

* cited by examiner

*Primary Examiner* — Masud K Khan
(74) *Attorney, Agent, or Firm* — Winston Hsu (57) ABSTRACT

An electronic device includes a data storage device and a host device. The host device is coupled to the data storage device via a predetermined interface and includes a processor. The processor dynamically adjusts a data transfer speed of the predetermined interface according to a data processing speed required by data to be read from or written to the data storage device.

10 Claims, 6 Drawing Sheets

METHODS FOR CONTROLLING DATA TRANSFER SPEED OF A DATA STORAGE DEVICE AND AN ELECTRONIC DEVICE UTILIZING THE SAME

CROSS REFERENCE TO RELATED APPLICATIONS

This Application claims priority of Taiwan Patent Application No. 106109514, filed on Mar. 22, 2017, the entirety of which is incorporated by reference herein.

BACKGROUND OF THE INVENTION

Field of the Invention

The invention relates to a method for controlling the data transfer speed of a device, so as to avoid problems caused by high temperatures due to the extremely high power consumption of the device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access efficiency of a memory device, a novel method for controlling the data transfer speed of the data storage device is provided, which can not only reduce the power consumption of the data storage device, but also avoid problems caused by high temperatures due to the extremely high power consumption of the device.

BRIEF SUMMARY OF THE INVENTION

An electronic device and methods for controlling the data transfer speed of a data storage device are provided. An exemplary embodiment of an electronic device comprises a data storage device and a host device. The host device is coupled to the data storage device via a predetermined interface and includes a processor. The processor dynamically adjusts a data transfer speed of the predetermined interface according to a data processing speed required by data to be read from or written to the data storage device.

An exemplary embodiment of a method for controlling a data transfer speed of a data storage device comprises: determining a data processing speed required by data to be read from or written to the data storage device; and dynamically adjusting the data transfer speed according to the data processing speed.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
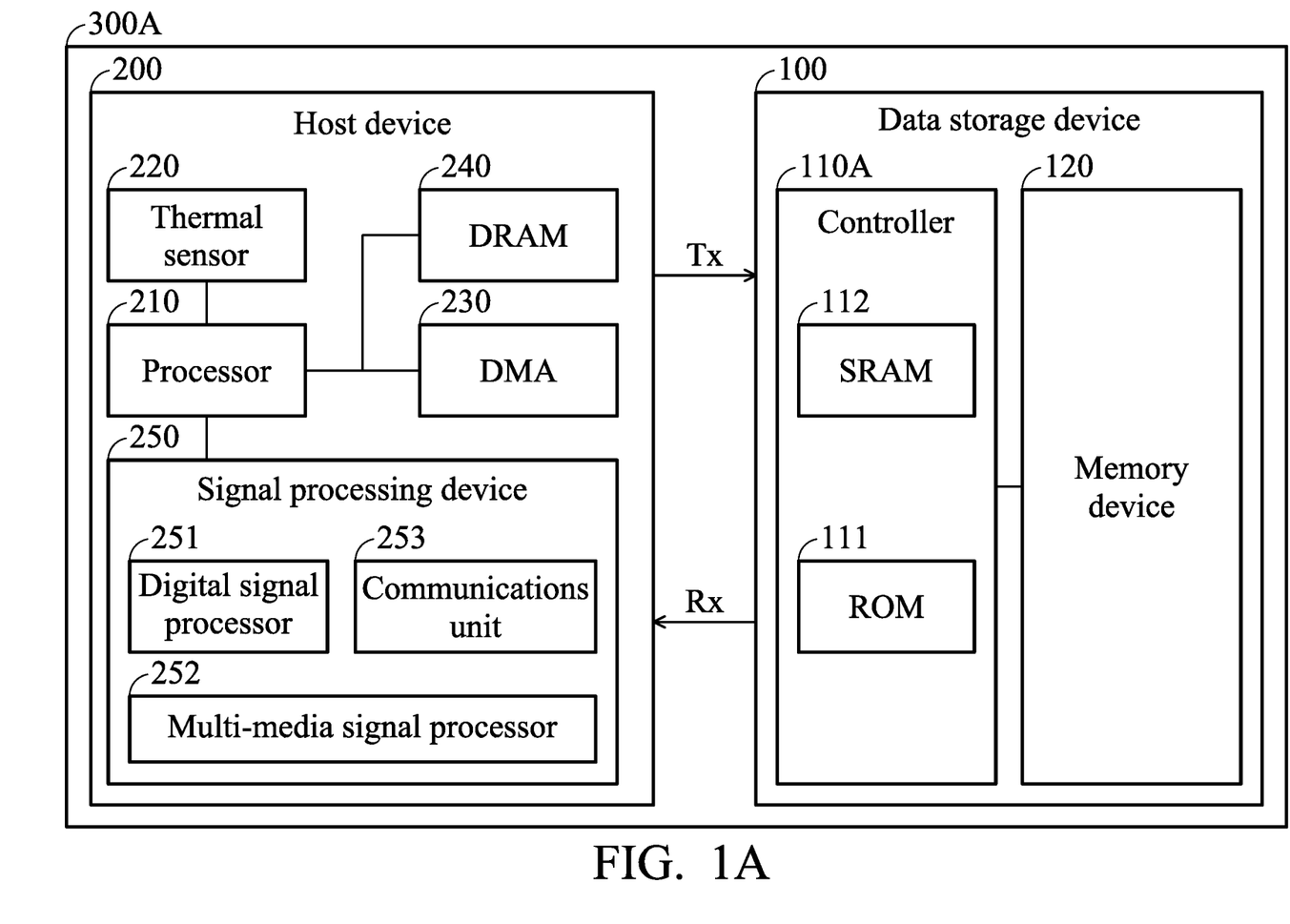
FIG. 1A shows an exemplary block diagram of an electronic device according to an embodiment of the invention.

FIG. 1A shows an exemplary block diagram of an electronic device according to an embodiment of the invention. The electronic device 300A may comprise a data storage device 100 and a host device 200. The data storage device 100 may comprise a controller 110A and a memory device 120. The controller 110 may comprise a Read Only Memory (ROM) 111 and a Static Random Access Memory (SRAM) 112. The memory device 120 may comprise one or more non-volatile memory devices such as a flash memory.

The host device 200 may at least comprise a processor 210, a thermal sensor 220, a Direct Memory Access (DMA) device 230, a Dynamic Random Access Memory (DRAM) 240 and a signal processing device 250. The thermal sensor 220 is configured to sense ambient temperature to obtain a sensed temperature and provide the sensed temperature to the processor 210. The DMA device 230 and the DRAM 240 are coupled to the data storage device 100 for transferring or buffering the data to be written to or read from the data storage device 100. The signal processing device 250 may comprise a plurality of different hardware devices for performing signal processing, such as a digital signal processor 251, a multi-media signal processor 252 and one or more communications units 253. The communications unit 253 may provide wired or wireless communications service. The communications unit 253 may comprise, for example, a radio transceiver, an antenna module and a modulator-demodulator (MODEM) (not shown), and may provide the wired or wireless communications service in compliance with a predetermined communications protocol. The processor 210 may control the operations of the components in the host device 200.

The host device 200 may be coupled to the data storage device 100 via a predetermined interface. For example, when the data storage device 100 comprises one or more Universal Flash Storage (UFS), the host device 200 may be coupled to the data storage device 100 via the UFS interface. As shown in FIG. 1A, the UFS interface may comprise a transmission path TX to transmit commands and data to the data storage device 100 and a reception path RX to receive command and data from the data storage device 100.

Figure 1B:
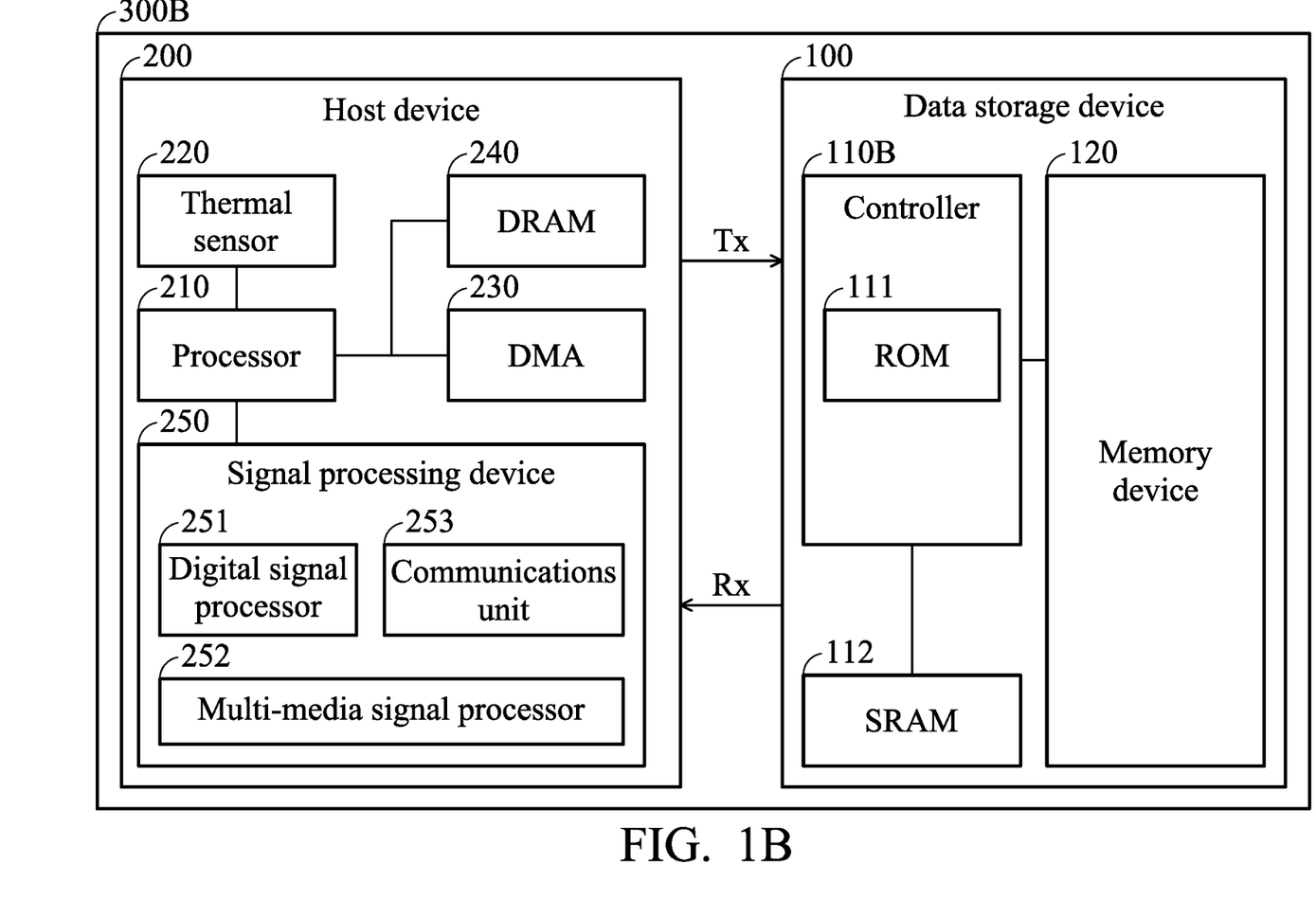
FIG. 1B shows an exemplary block diagram of an electronic device according to another embodiment of the invention.

FIG. 1B shows a block diagram of an electronic device according to another embodiment of the invention. In this embodiment, the SRAM 112 is configured outside of the controller 110B and is coupled to the controller 110B.

Note that for simplicity, FIG. 1A and FIG. 1B presents a simplified block diagram in which only the elements relevant to the invention are shown, and FIG. 1A and FIG. 1B merely show two of a variety of structures to implement the invention. However, the invention should not be limited the structures and components shown in FIG. 1A and FIG. 1B. In addition, in the embodiments illustrated above, the electronic devices 300A and 300B may be a mobile communications device, such as a smartphone, a smart watch, or a tablet computer, but the invention is not limited thereto.

As discussed above, the host device 200 and the data storage device 100 may be coupled to each other via the predetermined interface (such as the UFS interface). The host device 200 may transmit a power mode change request packet to the data storage device 100 for setting the data transfer speed of the predetermined interface.

Figure 2:
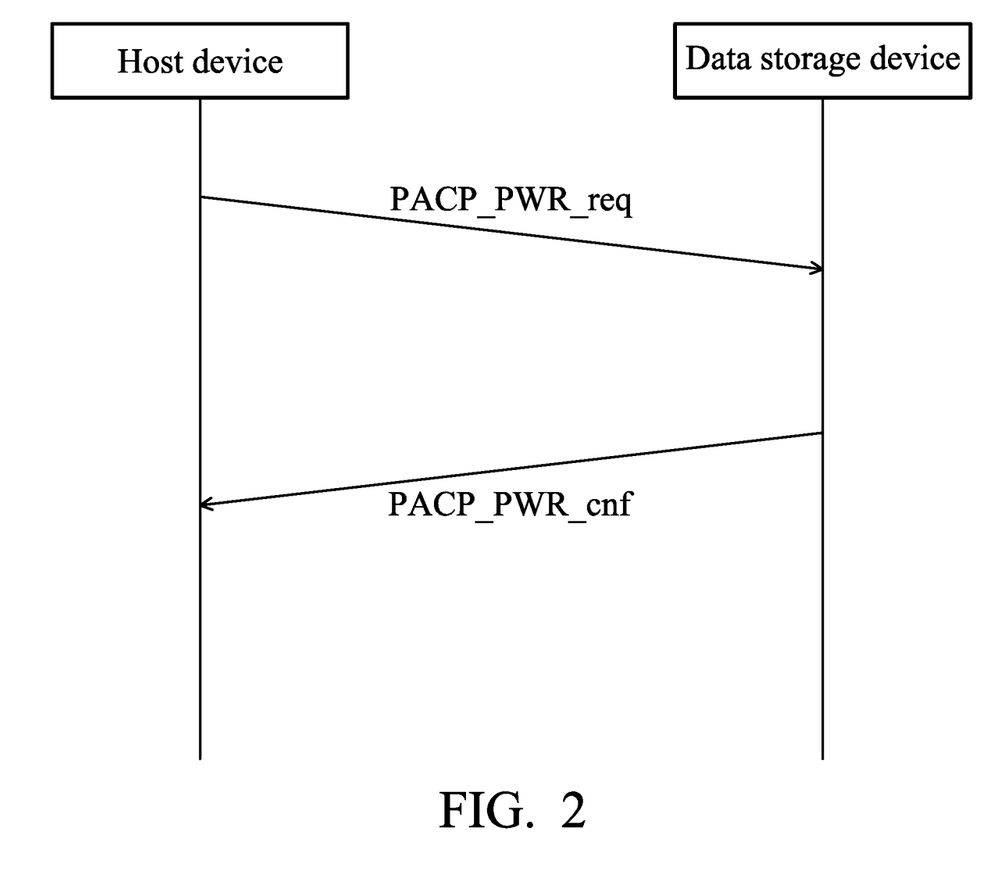
FIG. 2 shows an exemplary message flow for setting the data transfer speed of the predetermined interface according to an embodiment of the invention.

FIG. 2 shows an exemplary message flow for setting the data transfer speed of the predetermined interface according to an embodiment of the invention. The host device (for example, the processor 210) may transmit a power mode change request packet PACP_PWR_req to the data storage device. Upon receiving the power mode change request packet PACP_PWR_req, the data storage device (for example, the controller 110A or 110B) may reply a power mode change confirm packet PACP_PWR_cnf to the host device via the predetermined interface. When the process ends, the host device and the data storage device may use the data transfer speed indicated in the power mode change request packet PACP_PWR_req for data transmission.

According to an embodiment of the invention, the data transfer speed may comprise a transmission speed for the host device to transmit data to the data storage device and a reception speed for the host device to receive data from the data storage device. The power mode change request packet may comprise a TX speed field TXGear for setting the transmission speed and an RX speed field RXGear for setting the reception speed.

According to an embodiment of the invention, the transmission/reception speed of the UFS interface may be defined by two modes, comprising a power change mode (PWM) and a high speed mode (HS). The PWM mode further defines eight levels of speed, comprising PWM_G0~PWM_G7. The PWM_G0 defines the maximum transmission/reception speed as 3 Mbps, and the minimum transmission/reception speed as 0.01 Mbps. The PWM_G1 defines the maximum transmission/reception speed as 9 Mbps, and the minimum transmission/reception speed as 3 Mbps. The PWM_G2 defines the maximum transmission/reception speed as 18 Mbps, and the minimum transmission/reception speed as 6 Mbps. The PWM_G3 defines the maximum transmission/reception speed as 36 Mbps, and the minimum transmission/reception speed as 12 Mbps. The PWM_G4 defines the maximum transmission/reception speed as 72 Mbps, and the minimum transmission/reception speed as 24 Mbps. The PWM_G5 defines the maximum transmission/reception speed as 144 Mbps, and the minimum transmission/reception speed as 48 Mbps. The PWM_G6 defines the maximum transmission/reception speed as 288 Mbps, and the minimum transmission/reception speed as 96 Mbps. The PWM_G7 defines the maximum transmission/reception speed as 576 Mbps, and the minimum transmission/reception speed as 192 Mbps.

The HS mode further defines six levels of speed, comprising HS-G1~HS-G3, A-series and HS-G1~HS-G3, B-series. The HS-G1 A defines the transmission/reception speed as 1248 Mbps. The HS-G1 B defines the transmission/reception speed as 1457.6 Mbps. The HS-G2 A defines the transmission/reception speed as 2496 Mbps. The HS-G2 B defines the transmission/reception speed as 2915.2 Mbps. The HS-G3 A defines the transmission/reception speed as 4992 Mbps. The HS-G3 B defines the transmission/reception speed as 5830.4 Mbps.

In existing designs, when the electronic device (e.g., the electronic device 300A or 300B) or the host device (e.g., the host device 200) is powered up, the processor 210 sets the data transfer speed between the host device 200 and the data storage device 100 to the highest data transfer speed supported by the data storage device 100. Take the UFS interface as an example, the data transfer speed will be set to the level of HS-G3 B, so as to provide the highest data transfer speed. Therefore, in the existing designs, the data transfer speed of the predetermined interface is initially or by default set to the highest data transfer speed supported by the data storage device 100, and after the initial setting, the data transfer speed will not be adjusted further.

However, not all data transmissions need to be carried out at the highest data transfer speed. Therefore, such a design will produce unnecessary power consumption, and it is also possible to cause a temperature rise in the electronic device or the host device due to the high-speed functioning of the electronic components in the electronic device or the host device. The high temperatures may cause further damage to electronic components or shorten the lifespan of electronic components. Therefore, in the embodiments of the invention, several methods for controlling the data transfer speed are provided to improve upon the previous design and to reduce the power consumption of the electronic device or the host device, so that electrical energy can be preserved for other devices or components within the electronic device or the host device. In addition, the performance of the overall system (e.g. the system formed by the host device and the data storage device) can be improved and high temperatures in the electronic device or host device can be avoided.

According to an embodiment, in a first aspect of the invention, the processor 210 may adjust the data transfer speed adopted or utilized for transferring data between the host device 200 and the data storage device 100 via the predetermined interface according to the sensed temperature. To be more specific, in the designs which initially or by default set the data transfer speed to the highest data transfer speed supported by the data storage device 100, when the processor 210 of the host device 200 determines that the sensed temperature is higher than a high-temperature threshold, the processor 210 may adjust the data transfer speed of the predetermined interface according to the data processing speed required by the next unit of data (or subsequent data) to be read from or written to the data storage device.

Figure 3:
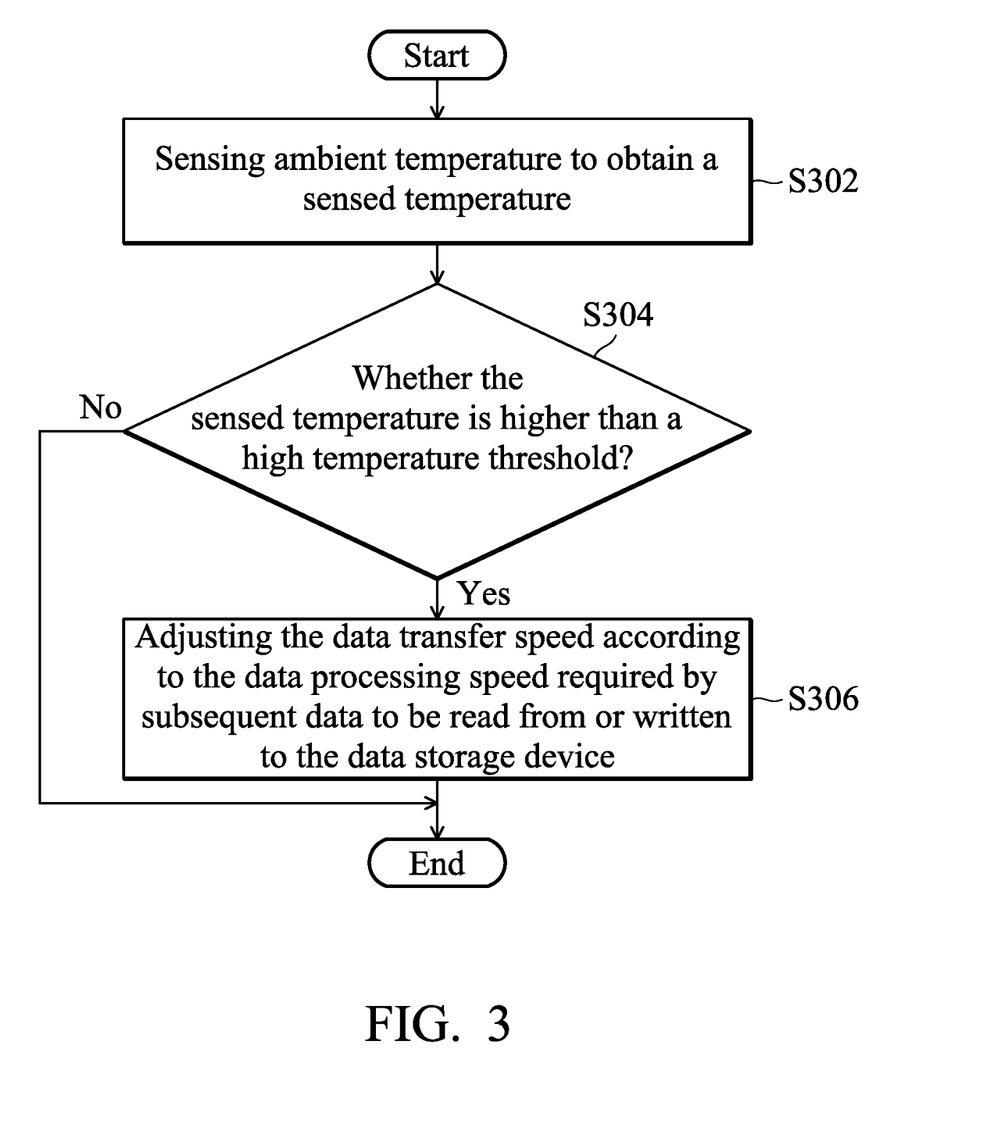
FIG. 3 shows a flow chart of a method for controlling the data transfer speed of a data storage device according to an embodiment of a first aspect of the invention.

FIG. 3 shows a flow chart of a method for controlling the data transfer speed of a data storage device according to an embodiment in a first aspect of the invention. First of all, the thermal sensor 220 is configured to sense ambient temperature to obtain a sensed temperature (Step S302). Next, the processor 210 determines whether the sensed temperature is higher than a high-temperature threshold (step S304). If so, the processor 210 adjusts a data transfer speed according to the data processing speed required by the next unit of data (or subsequent data) to be read from or written to the data storage device (step S306). If not, the processor 210 may not adjust the current data transfer speed. Note that in other embodiments of the invention, when the sensed temperature is not higher than the high-temperature threshold, the processor 210 may also adjust the data transfer speed according to other factors, which will be illustrated in more detailed in the following paragraphs.

According to an embodiment of the invention, the data processing speed required by the data in the electronic device or the host device may be determined or defined according to the standards of the hardware devices which receive or process the data, content of the software task using the data, the data format of the data, the manner in which the data is applied, the intended time to use or process the data, the speed required to use or process the data, the preference of the user, or others. The data processing speed required by the data may be defined by a specific speed or a specific range of speeds. The speed range may be defined by a minimum transfer speed and a maximum transfer speed. For example, the speed range may be 1 Mbps~3 Mbps.

As an example, the data processing speed required by the multimedia data may be determined according to the image resolution, the data format and the data processing speed of the encoder/decoder. Display lag can cause user experience to suffer. Because display lag can occur when the data processing speed is too low, the specific speed or the minimum transfer speed mentioned above should be defined as being at least higher than the speed at which the encoder/decoder can smoothly processes the image data, and at which the image data can be smoothly displayed without any lag.

When the sensed temperature is higher than a high-temperature threshold, the processor 210 may adjust the data transfer speed adopted between the host device and the data storage device 100 for transferring data according to the specific speed or the specific range of speeds. As an example, when the predetermined interface is the UFS interface, the processor 210 may select a speed level which is closest to the specific speed or can satisfy the specific speed range from the fourteen levels discussed above. Here, the term "satisfy" may refer to the data transfer speed supported by the selected speed level not being lower than the specific speed or the minimum transfer speed, or falling within the specific range of speeds.

In another example, the processor 210 may decrease the current data transfer speed according to the specific speed or the specific range of speeds. In yet another example, the processor 210 may decrease the current data transfer speed according to the minimum transfer speed required by the data. In still another example, the processor may directly set the data transfer speed to the specific speed or the minimum transfer speed required by the data, or set the data transfer speed to a value which is closest to the specific speed or the minimum transfer speed.

According to an embodiment of the second aspect of the invention, the processor 210 may not initially or by default set the data transfer speed to the highest data transfer speed supported by the data storage device 100, but dynamically adjust the data transfer speed utilized for transferring data via the predetermined interface between the host device 200 and the data storage device 100 according to the data processing speed required by data to be read from or written to the data storage device.

Figure 4:
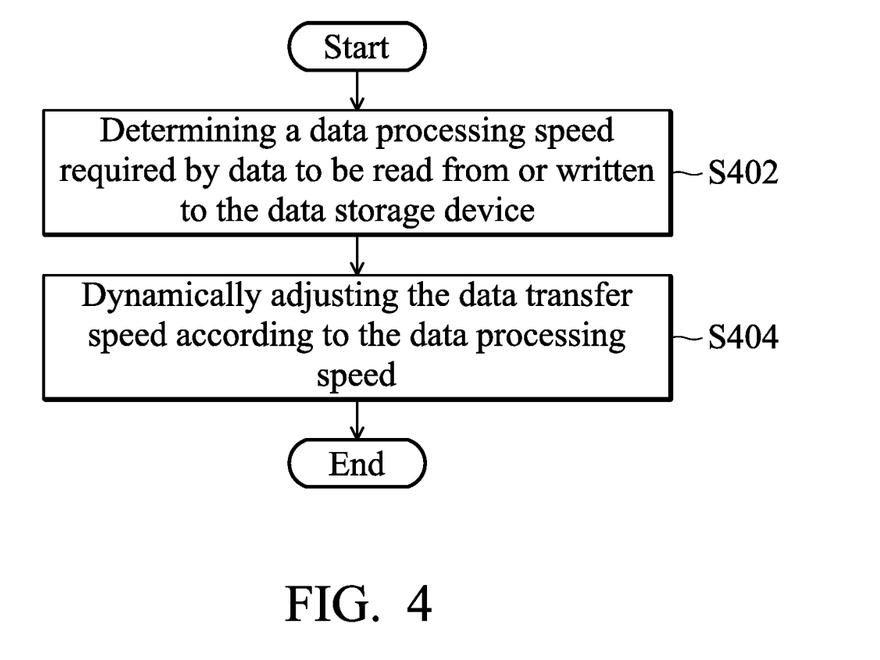
FIG. 4 shows a flow chart of a method for controlling the data transfer speed of a data storage device according to an embodiment of a second aspect of the invention.

FIG. 4 shows a flow chart of a method for controlling the data transfer speed of a data storage device according to an embodiment of a second aspect of the invention. First of all, the processor 210 may determine the data processing speed required by data to be read from or written to the data storage device (Step S402). The data processing speed required by the data may be predetermined or predefined. For example, the data processing speed required by the data may be predetermined or predefined according to the standards of the hardware devices which receive or process the data, content of the software task using the data, the data format of the data, the manner in which the data is applied, the intended time to use or process the data, the speed required to use or process the data, the preference of the user, or others, when implementing the software programs. The data processing speed required by the data may be defined by a specific speed or a specific range of speeds. The speed range may be defined by a minimum transfer speed and a maximum transfer speed. For example, the speed range may be 1 Mbps~3 Mbps.

In addition, the data processing speed required by the data may also be dynamically determined by the processor 210 or determined in real-time based on a specific algorithm according to the factors discussed above. Next, the processor 210 may dynamically adjust the data transfer speed according to the data processing speed required by data to be read from or written to the data storage device (Step S404). For example, when the predetermined interface is the UFS interface, the processor 210 may select a speed level which is closest to the specific speed or can satisfy the specific speed range from the fourteen levels discussed above. Here, the term "satisfy" may refer to the data transfer speed supported by the selected speed level not being lower than the specific speed or the minimum transfer speed, or falling within the specific range of speeds. In another example, the processor 210 may directly set the data transfer speed according to the specific speed or the minimum transfer speed required by the data. For example, the processor 210 may directly set the data transfer speed to the specific speed or the minimum transfer speed required by the data, or it may set the data transfer speed to a value which is closest to the specific speed or the minimum transfer speed.

According to an embodiment of the invention, the processor 210 may periodically trigger the method illustrated in FIG. 4 for controlling the data transfer speed, or trigger the method illustrated in FIG. 4 for controlling the data transfer speed by events. The events may be, for example, when the processor 210 receives a request from the data storage device 100, or when the sensed temperature is higher than or lower than the high-temperature threshold.

According to an embodiment of the invention, when the sensed temperatures are different, the data transfer speed utilized for transferring data via the predetermined interface between the host device 200 and the data storage device 100 may be set to different values. In addition, according to an embodiment of the invention, when different data processing speeds are required by different data, the data transfer speed utilized for transferring data between the host device 200 and the data storage device 100 via the predetermined interface may be set to different values.

According an embodiment of a third aspect of the invention, the processor 210 may determine or adjust the data transfer speed utilized for transferring data between the host device 200 and the data storage device 100 via the predetermined interface according to the transmission bandwidth requirements of the data or whether the data has to be processed immediately. In addition, the processor may also determine or adjust the data transfer speed utilized for transferring data between the host device 200 and the data storage device 100 via the predetermined interface according to any combination of the determination factors discussed above.

Figure 5:
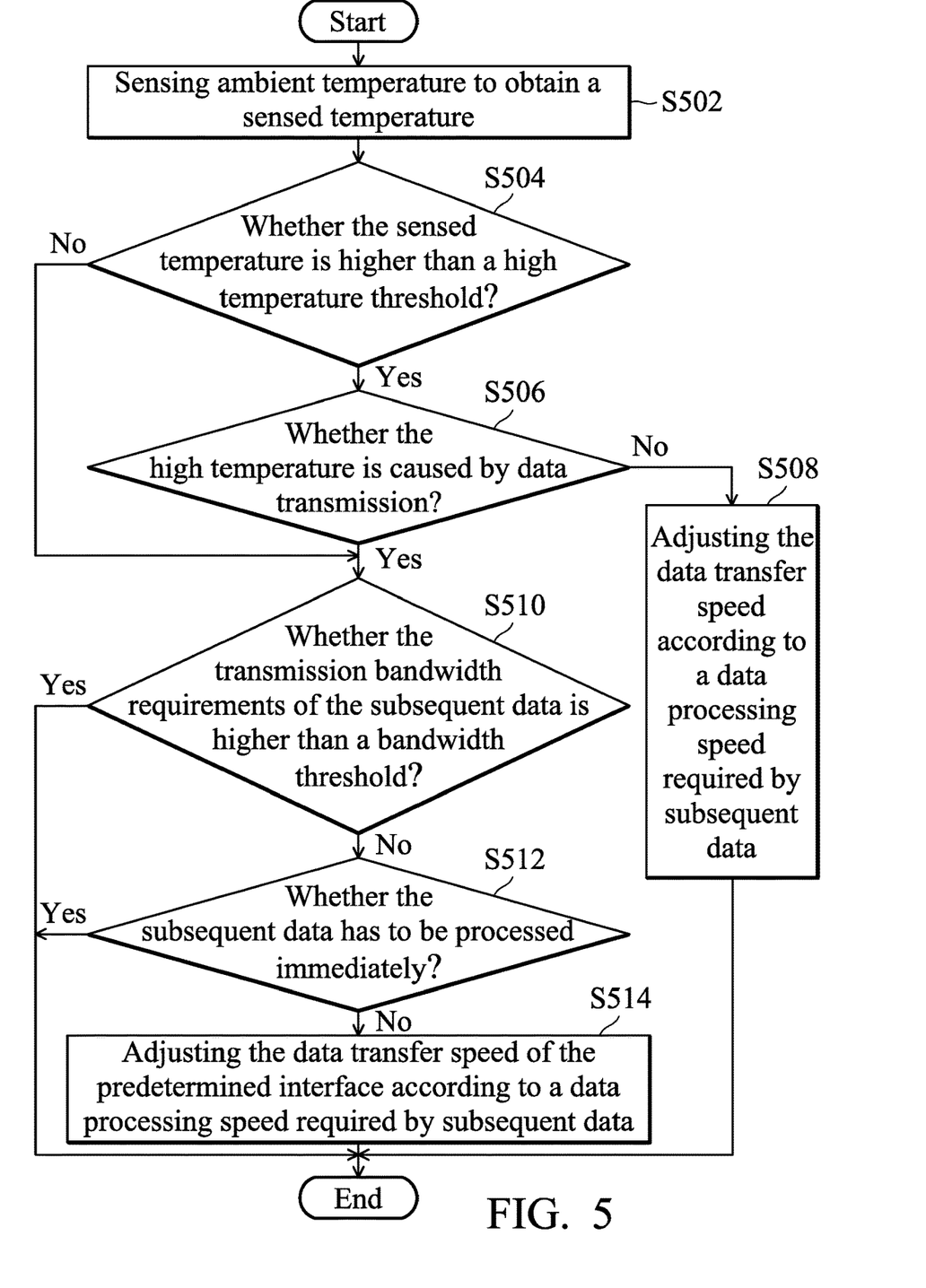
FIG. 5 shows a flow chart of a method for controlling the data transfer speed of a data storage device according to an embodiment of a third aspect of the invention.

FIG. 5 shows a flow chart of a method for controlling the data transfer speed of a data storage device according to an embodiment of a third aspect of the invention. First of all, the thermal sensor 220 is configured to sense ambient temperature to obtain a sensed temperature (Step S502). Next, the processor 210 determines whether the sensed temperature is higher than a high-temperature threshold (Step S504). If so, the processor 210 further determines whether the high temperature is caused by data transmission (Step S506). If not, the processor 210 may directly adjust a data transfer speed according to the data processing speed required by the next unit of data (or subsequent data) to be read from or written to the data storage device (Step S508). For example, in the designs which initially or by default set the data transfer speed to the highest data transfer speed supported by the data storage device 100, the processor 210 may decrease the data transfer speed according to the data processing speed required by subsequent data to be read from or written to the data storage device in advance, so as to prevent the temperature from increasing further.

When the high-temperature is caused by data transmission, or the sensed temperature is not higher than a high-temperature threshold, the processor 210 may further determine whether the transmission bandwidth requirements of the next unit of data is higher than a bandwidth threshold (Step S510). If not, the processor 210 may further determine whether the next unit of data has to be processed immediately (Step S512). If the next unit of data does not have to be processed immediately, the processor 210 may directly adjust the data transfer speed of the predetermined interface according to the data processing speed required by subsequent data to be read from or written to the data storage device (Step S514), or the processor 210 may directly decrease the data transfer speed, so as to prevent the temperature from increasing further. For example, the processor 210 may decrease the data transfer speed according to the data processing speed required by subsequent data to be read from or written to the data storage device in advance, so as to prevent the temperature from increasing further.

If the transmission bandwidth requirements of the next unit of data is higher than a bandwidth threshold, or the next unit of data has to be processed immediately, the processor 210 might not adjust the current data transfer speed (for example, when the sensed temperature is higher than the high-temperature threshold and the high-temperature is caused by data transfer), or the processor 210 may increase the current data transfer speed (for example, when the sensed temperature is not higher than the high-temperature threshold), so as to further increase the transmission efficiency.

According to an embodiment of the invention, the processor 210 may determine or predict whether the next unit of data (or subsequent data) has to be processed or used immediately according to the length of the time interval for the data currently being buffered in the DRAM 240 or other registers. For example, when the time it takes for the data currently being buffered in the DRAM 240 or other registers is less than 1 second, the processor 210 may determine or predict that the next unit of data has to be processed or used immediately. According to another embodiment of the invention, the processor 210 may determine or predict whether the next unit of data (or subsequent data) has to be processed or used immediately according to the destination address of the data. For example, when the destination address of the data is directed to the internal register of the multi-media signal processor 252, the processor 210 may determine or predict that the next unit of data has to be processed or used immediately. According to another embodiment of the invention, the processor 210 may determine or predict whether the next unit of data (or, subsequent data) has to be processed or used immediately according to the usage of the next unit of data (or, subsequent data). For example, when the application programs or the hardware devices requiring the data are among the programs or hardware devices that usually require a huge amount of data to perform calculations or processing, the processor 210 may determine or predict that the next unit of data has to be processed or used immediately.

As discussed above, in the embodiments of the invention, several methods for controlling the data transfer speed are provided to overcome the defects of previous designs and to reduce the power consumption of the electronic device or the host device, so that electrical energy can be preserved for other devices or components within the electronic device or host device. In addition, the performance of the overall system (e.g. the system formed by the host device and the data storage device) can be improved and the high temperature of the electronic device or host device can be avoided.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
a data storage device; and
a host device, coupled to the data storage device via a predetermined physical interface, comprising:
  a signal processing device, configured to process data, that is read from the data storage device or written to the data storage device via the predetermined physical interface, with a data processing speed; and
  a processor, configured to determine whether a sensed ambient temperature is higher than a high temperature threshold, when the sensed ambient temperature is higher than the high temperature threshold, configured to determine a data processing speed required by subsequent data to be read from the data storage device or written to the data storage device, and configured to dynamically adjust a data transfer speed of the predetermined physical interface between the host device and the data storage device to transfer data from the host device to the data storage device or from the data storage device to the host device with the adjusted data transfer speed, wherein the adjusted data transfer speed is set according to the required data processing speed of the subsequent data, wherein the processor is further configured to:
    determine whether the sensed ambient temperature being higher than the high temperature threshold is caused by data transmission;
    when the sensed ambient temperature being higher than the high temperature threshold is caused by data transmission, determine whether transmission bandwidth requirements of the subsequent data are higher than a bandwidth threshold;
    when transmission bandwidth requirements of the subsequent data are not higher than a bandwidth threshold, determine whether the subsequent data has to be processed immediately; and
    when the subsequent data does not have to be processed immediately, dynamically adjust the data transfer speed of the predetermined physical interface between the host device and the data storage device to transfer data from the host device to the data storage device or from the data storage device to the host device with the adjusted data transfer speed.

2. The electronic device as claimed in claim 1, wherein the required data processing speed is a minimum transfer speed required by the subsequent data, and the processor sets the adjusted data transfer speed according to the minimum transfer speed required by the subsequent data.

3. The electronic device as claimed in claim 1, wherein the data transfer speed is set to different values when different data processing speeds are required by different data.

4. The electronic device as claimed in claim 1, wherein the data transfer speed comprises a transmission speed for the processor to transmit data to the data storage device and a reception speed for the processor to receive data from the data storage device.

5. The electronic device as claimed in claim 1, wherein the data storage device comprises a Universal Flash Storage (UFS), and the predetermined physical interface is a UFS interface.

6. A method for controlling data transfer speed of an electronic device, wherein the electronic device comprises a data storage device and a host device, and the host is coupled to the data storage device via a predetermined physical interface, and the host device comprises a signal processing device, the method comprising:
   determining a data processing speed required by the signal processing device to process data that is read from or written to the data storage device via the predetermined physical interface;
   determining whether a sensed ambient temperature is higher than a high temperature threshold; and
   when the sensed ambient temperature is higher than the high temperature threshold, determining a data processing speed required by subsequent data to be read from the data storage device or written to the data storage device, and dynamically adjusting a data transfer speed of the predetermined physical interface between the host device and the data storage device to transfer data from the host device to the data storage device or from the data storage device to the host device with the adjusted data transfer speed, wherein the adjusted data transfer speed is set according to the required data processing speed of the subsequent data, further comprising:
   determining whether the sensed ambient temperature being higher than the high temperature threshold is caused by data transmission;
   when the sensed ambient temperature being higher than the high temperature threshold is caused by data transmission, determining whether transmission bandwidth requirements of the subsequent data are higher than a bandwidth threshold;
   when transmission bandwidth requirements of the subsequent data are not higher than a bandwidth threshold, determining whether the subsequent data has to be processed immediately; and
   when the subsequent data does not have to be processed immediately, dynamically adjusting the data transfer speed of the predetermined physical interface between the host device and the data storage device to transfer data from the host device to the data storage device or from the data storage device to the host device with the adjusted data transfer speed.

7. The method as claimed in claim 6, wherein the required data processing speed is a minimum transfer speed required by the subsequent data, and wherein the step of dynamically adjusting the data transfer speed according to the data processing speed further comprises:
   setting the adjusted data transfer speed according to the minimum transfer speed required by the subsequent data.

8. The method as claimed in claim 6, wherein the data transfer speed is set to different values when different data processing speeds are required by different data.

9. The method as claimed in claim 6, wherein the data transfer speed comprises a transmission speed for a host device to transmit data to the data storage device and a reception speed for the host device to receive data from the data storage device.

10. The method as claimed in claim 6, wherein the data storage device comprises a Universal Flash Storage (UFS), and the predetermined physical interface is a UFS interface.

* * * * *